United States Patent
Tanaka et al.

(10) Patent No.: US 11,312,421 B2
(45) Date of Patent: Apr. 26, 2022

(54) VEHICLE BODY STRUCTURE HAVING A REINFORCING MEMBER

(71) Applicant: Toyota Jidosha Kabushiki Kaisha, Toyota (JP)

(72) Inventors: Motoki Tanaka, Toyota (JP); Koji Saeki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 62 days.

(21) Appl. No.: 16/532,785

(22) Filed: Aug. 6, 2019

(65) Prior Publication Data

US 2020/0047816 A1 Feb. 13, 2020

(30) Foreign Application Priority Data

Aug. 10, 2018 (JP) .............................. JP2018-151255

(51) Int. Cl.
*B62D 25/14* (2006.01)
*B60R 13/08* (2006.01)
*B62D 25/20* (2006.01)

(52) U.S. Cl.
CPC ............ *B62D 25/14* (2013.01); *B60R 13/083* (2013.01); *B62D 25/20* (2013.01)

(58) Field of Classification Search
CPC ............ B62D 25/2009; B62D 25/2018; B62D 25/2045; B62D 25/20; B62D 20/14; B60R 13/083
USPC .............................. 296/187.05, 187.08, 39.3
See application file for complete search history.

(56) References Cited

U.S. PATENT DOCUMENTS

| | | | | |
|---|---|---|---|---|
| 4,574,915 A | * | 3/1986 | Gahlau | B32B 5/18 181/290 |
| 5,633,067 A | * | 5/1997 | Illbruck | B60R 13/0838 428/138 |
| 5,713,625 A | * | 2/1998 | Takahashi | B62D 25/082 296/204 |
| 5,882,065 A | * | 3/1999 | Koiwa | B62D 25/082 296/187.09 |
| 6,102,466 A | * | 8/2000 | Kanazawa | B60N 3/066 296/75 |
| 6,145,923 A | | 11/2000 | Masuda | |

(Continued)

FOREIGN PATENT DOCUMENTS

| | | |
|---|---|---|
| JP | S63-247176 A | 10/1988 |
| JP | H01-254476 A | 10/1989 |

(Continued)

*Primary Examiner* — D Glenn Dayoan
*Assistant Examiner* — Kevin P Weldon
(74) *Attorney, Agent, or Firm* — Dinsmore & Shohl LLP

(57) ABSTRACT

A vehicle body structure includes a dash panel separating a vehicle front part from a vehicle cabin, a front side member extending longitudinally of a vehicle body in the vehicle front part and having ends located rearward of the vehicle body, opposite to the dash panel, a floor frame member forming a floor frame of the vehicle cabin, and a plate-shape reinforcing member disposed further toward a center of the vehicle cabin with respect to the dash panel and the floor frame member to be opposite to the ends of the front side member. The reinforcing member includes an upper portion secured to the dash panel and a lower portion secured to the floor frame member, and has a curvature that is smaller than a curvature of the dash panel.

4 Claims, 4 Drawing Sheets

(56) References Cited

U.S. PATENT DOCUMENTS

| | | | |
|---|---|---|---|
| 6,688,676 B1* | 2/2004 | Sato | B62D 21/152 296/187.05 |
| 9,487,236 B2* | 11/2016 | Ozawa | B62D 25/082 |
| 2008/0084092 A1* | 4/2008 | Yokoi | B62D 25/2018 296/203.02 |
| 2014/0001790 A1* | 1/2014 | Zischke | B62D 25/2018 296/187.03 |
| 2015/0145284 A1 | 5/2015 | Nishida et al. | |
| 2017/0080978 A1 | 3/2017 | Yoshida et al. | |
| 2019/0359151 A1* | 11/2019 | Ishii | G10K 11/168 |
| 2020/0332688 A1* | 10/2020 | Skestone | F01N 1/24 |
| 2021/0284245 A1* | 9/2021 | Nakamura | B62D 25/04 |
| 2021/0323611 A1* | 10/2021 | Nagashima | B60K 26/02 |

FOREIGN PATENT DOCUMENTS

| | | | | |
|---|---|---|---|---|
| JP | 565079 A | | 3/1993 | |
| JP | 2007-15443 A | | 1/2007 | |
| JP | 2008285019 | * | 11/2008 | B60J 5/00 |
| JP | 2009-248593 A | | 10/2009 | |
| JP | 2013-147163 A | | 8/2013 | |
| WO | 2013/080305 A1 | | 6/2013 | |

* cited by examiner

VEHICLE BODY STRUCTURE HAVING A REINFORCING MEMBER

CROSS REFERENCE TO RELATED APPLICATION

This application claims priority to Japanese Patent Application No. 2018-151255 filed on Aug. 10, 2018, which is incorporated herein by reference in its entirety including the specification, claims, drawings, and abstract.

TECHNICAL FIELD

The present disclosure relates to a vehicle body structure, and particularly to a reinforcing member disposed between a dash panel and a floor frame member, and to a peripheral structure of the reinforcing member.

BACKGROUND

Known vehicle body structures include a dash panel that separates a vehicle front part and a vehicle cabin, and a front side member extending along the length of a vehicle in the vehicle front part and having ends located rearward of the vehicle body, that face the dash panel.

In a frontal crash of the vehicle, this vehicle body structure may suffer from deformation of the dash panel toward the vehicle cabin caused by an impact load transmitted to the dash panel from the front side member. To reduce such deformation of the dash panel, a reinforcing member (gusset) may be disposed between the dash panel and a floor frame member in the vehicle cabin, to cause the floor frame member to bear the impact load. Patent Document 1 listed below discloses a structure in which the impact load from the front side member is received by the floor frame member.

CITATION LIST

Patent Literature

[Patent Document 1] JP 2009-248593 A

SUMMARY

There is therefore a demand for efficiently transmitting an impact load from a front side member to a floor frame member, to thereby reduce deformation of a vehicle cabin appropriately.

An embodiment of the disclosure is directed toward providing a vehicle body structure that allows efficient transmission of an impact load from the front side member to the floor frame member.

A vehicle body structure according to an embodiment of the disclosure includes a dash panel that separates a vehicle front part from a vehicle cabin, a front side member extending along a length of a vehicle body in the vehicle front part and including an end located rearward of the vehicle body, that is opposite to and secured to the dash panel, a floor frame member forming a floor frame of the vehicle cabin, and a reinforcing member having a plate shape and disposed further toward a center of the vehicle cabin with respect to the dash panel and the floor frame member. The reinforcing member is disposed opposite to the end of the front side member located rearward of the vehicle body, and includes an upper portion secured to the dash panel and a lower portion secured to the floor frame member. The reinforcing member has a curvature that is smaller than a curvature of the dash panel. This structure, which includes the plate-shape reinforcing member having a curvature that is smaller than the curvature of the dash panel, allows efficient transmission of an impact load from the front side member, via the reinforcing member, to the floor frame member.

In the vehicle body structure, a soundproof member of a sheet shape having a predetermined thickness may be disposed further toward the center of the vehicle cabin with respect to the dash panel, and a part of the soundproof member is disposed in a space between the dash panel and the reinforcing member. This structure allows further increase in the space in the vehicle cabin as compared to a structure including the soundproof member disposed to cover the reinforcing member within the vehicle cabin. This structure, including the soundproof member supported between the dash panel and the reinforcing member, further reduces vibration noise of the soundproof member. This structure further allows a loose portion of the soundproof member, if any, to be disposed in a space between the dash panel and the reinforcing member, thereby reducing the vibration noise caused by the loose portion.

In the above vehicle body structure, the reinforcing member may be disposed opposite to a pedal in the vehicle cabin. When the soundproof member is disposed in the space between the dash panel and the reinforcing member to thereby increase the space in front of the pedal as compared to the structure including the soundproof member disposed to cover the reinforcing member within the vehicle cabin, the structure of the disclosure allows the pedal to be disposed further forward in the vehicle body.

In the above body structure, the reinforcing member may include a surface including a protrusion and a recess, and a fastening member may be placed in the recess in the reinforcing member to fasten the reinforcing member to the dash panel and the floor frame member. Rigidity of the reinforcing member in this vehicle body structure can be enhanced by the protrusion and the recess. It is also possible to prevent significant protrusion, toward the vehicle cabin, of the fastening member placed in the recess.

The vehicle body structure according to the disclosure enables efficient transmission of an impact load from the front side member, via the reinforcing member, to the floor frame member.

BRIEF DESCRIPTION OF DRAWINGS

An embodiment of the present disclosure will be described by reference to the following figures, wherein.

DESCRIPTION OF EMBODIMENTS

Figure 1:
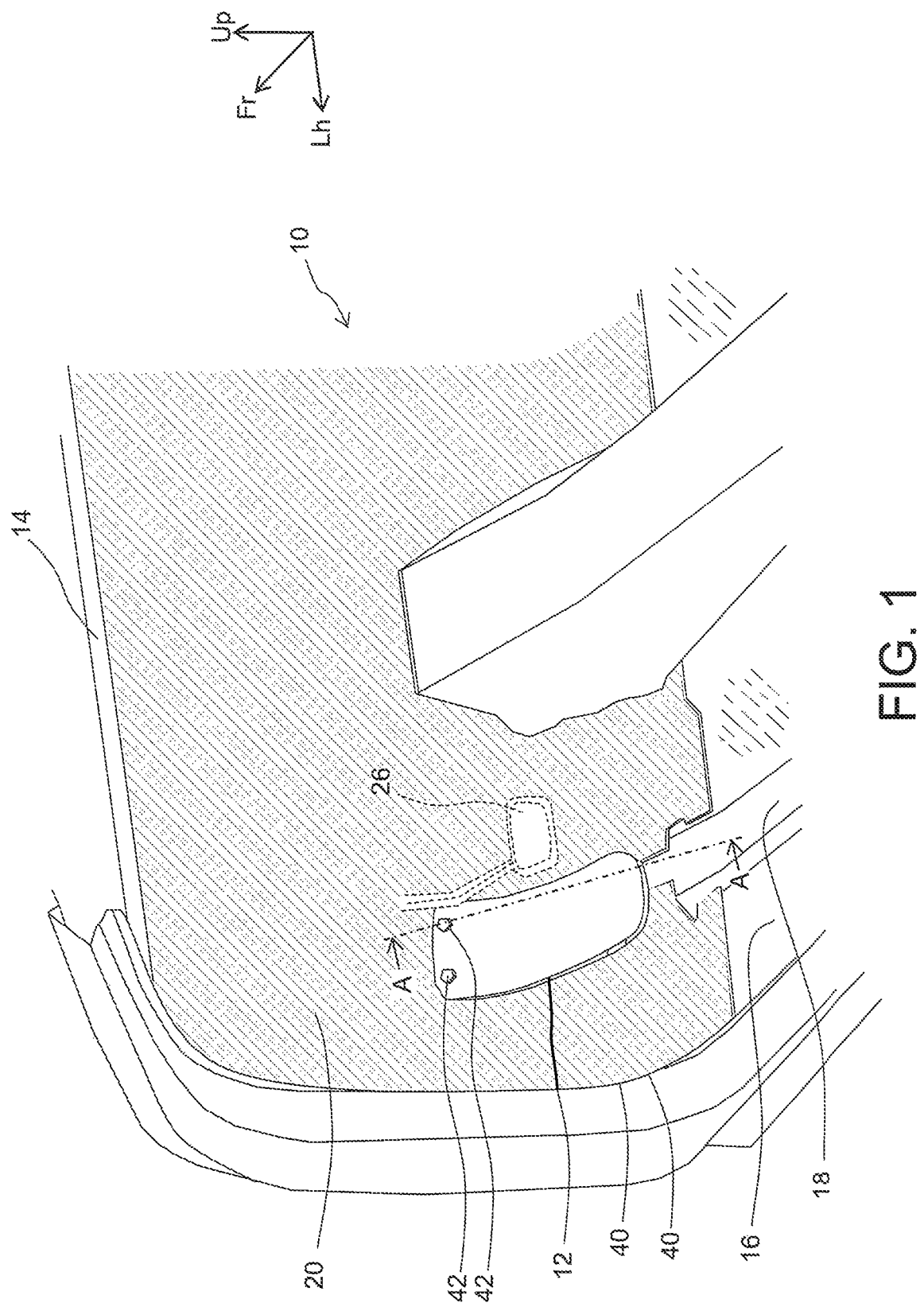
FIG. 1 is a perspective view illustrating a front left portion of a vehicle body in the middle of assembling.

An embodiment of a vehicle body structure according to the disclosure will be described by reference to the drawings. The shapes, materials, and the like, which will be described below, are only examples used for explanation, and may be changed as appropriate in accordance with the specification of a vehicle. In the following description, similar elements are designated by similar reference numerals in all the drawings, and will not be described repeatedly. In the drawings, an arrow Fr indicates the forward direction of the vehicle body, an arrow Up indicates the upward direction of the vehicle body, and an arrow Lh indicates the leftward direction of the vehicle body.

Figure 2:
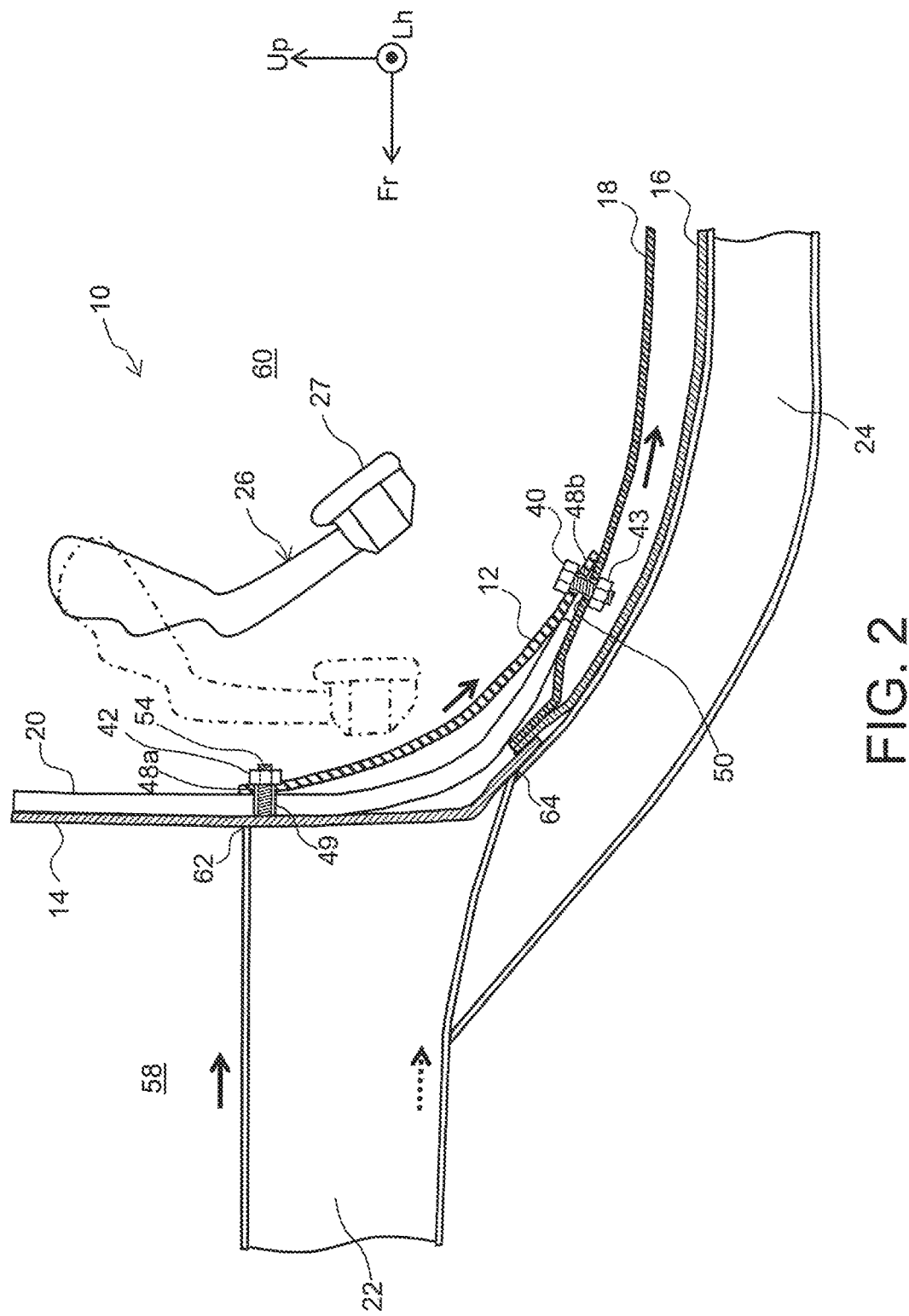
FIG. 2 is a cross sectional view taken along line A-A in FIG. 1.

FIG. 1 is a perspective view illustrating a front left portion of a vehicle cabin of a vehicle body in the middle of assembling, and FIG. 2 is a cross sectional view taken along A-A in FIG. 1. FIG. 1 illustrates a reinforcing member 12 without recesses and protrusions on its surface, and indicates a position where a brake pedal 26 is disposed; that is, a position where the brake pedal 26 is not stepped on, by dashed lines. FIG. 2 illustrates the brake pedal 26 in the non-stepped position with a solid line and illustrates the brake pedal 26 in a stepped position with dashed and single-dotted lines. As illustrated in FIG. 1, the vehicle body according to the embodiment includes the brake pedal 26 disposed on the left side of the vehicle body, and includes a driver's seat on the left side; the vehicle body according to the embodiment has a vehicle body structure with a left-side steering wheel.

The vehicle body structure 10 includes a dash panel 14 (only a top portion of which is shown in FIG. 1) that separates a vehicle front part where an engine and the like are disposed and a vehicle cabin, a dash panel inner silencer 20 disposed further toward the vehicle cabin with respect to the dash panel 14, a floor reinforcement 18 having a C-shape cross section and forming a floor frame of the vehicle cabin, a floor panel 16 disposed under the floor reinforcement 18, and the reinforcing member 12 disposed above the dash panel inner silencer 20 at a position substantially opposite to a step portion 27 of the brake pedal 26 (see FIG. 2).

The dash panel inner silencer 20 reduces noise from the vehicle front part including the engine and other components toward the vehicle cabin. Hereinafter, the dash panel inner silencer 20 will be referred to as a soundproof member 20 as appropriate. Also, the floor reinforcement 18 will be referred to as a floor frame member 18 as appropriate.

As illustrated in FIG. 2, the vehicle body structure 10 further includes a front side member 22 extending along the length of the vehicle body in a vehicle front part 58, and an under reinforcement 24 coupled to the underside of the front side member 22 to extend longitudinally in the vehicle body along the floor panel 16. Each of the front side member 22 and the under reinforcement 24 has a rectangular closed cross section. A pair of front side members 22 and a pair of under reinforcement 24 are disposed on opposite left and right sides in the vehicle width direction. More specifically, the front side members 22 are disposed both on the driver side or the left in the vehicle body and on the passenger side or the right side in the vehicle body, and the under reinforcements 24 are similarly disposed both on the driver side or the left in the vehicle body and on the passenger side or the right side in the vehicle body. Both the floor reinforcements 18 (floor frame member) and the reinforcing members 12 are similarly disposed in pairs on left and right sides, corresponding to the front side members 22 and the under reinforcement 24. In the following description, an example structure on the driver side or the left in the vehicle body will be described; the structure on the passenger side or the right in the vehicle body has the same structure except for the brake pedal 26.

The front side member 22, the under reinforcement 24, the dash panel 14, the floor panel 16, and the floor reinforcement 18 each have a thickness of about 1 to 3 mm, for example. The dash panel inner silencer 20, made of felt, has a thickness of about 2 to 3 cm. Thus, the dash panel inner silencer 20 or the soundproof member 20 has a larger thickness than other components.

As illustrated in FIG. 2, the reinforcing member 12 connects between the dash panel 14 and the floor frame member 18. In a frontal crash, the reinforcing member 12 partially transmits an impact load from the front side member 22 to the floor frame member 18 to thereby reduce inward deformation of the dash panel 14 toward the vehicle cabin 60. The reinforcing member 12 is also referred to as a gusset.

Figure 3:
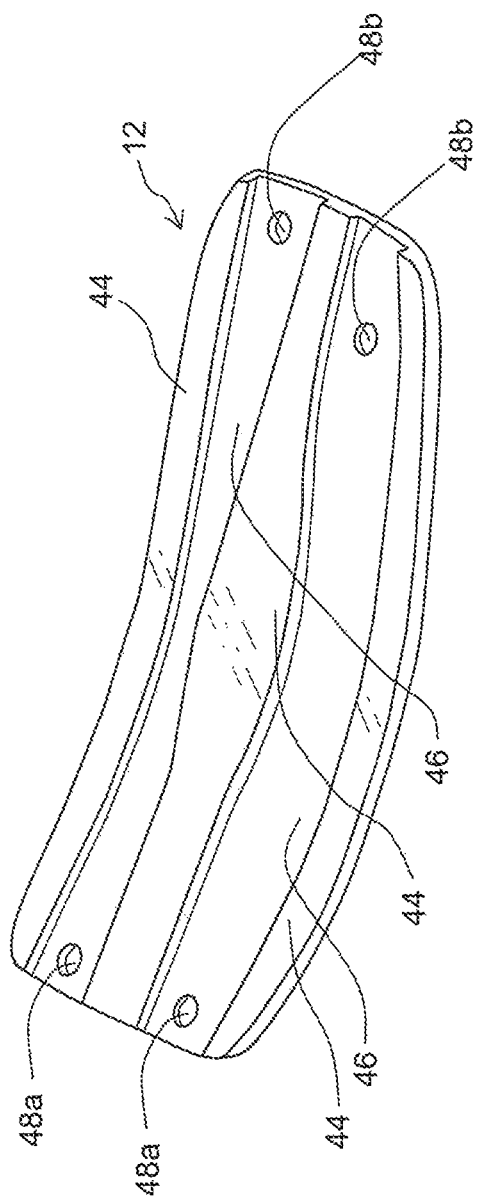
FIG. 3 is a perspective view of a reinforcing member.

FIG. 3 is a perspective view of the reinforcing member 12. The reinforcing member 12 is a substantially rectangular plate including a part near its center curved downward. The reinforcing member 12 includes, on its surface, a plurality of protrusions 44 and recesses 46 each extending longitudinally to thereby increase the rigidity of the reinforcing member 12. The reinforcing member 12 is disposed in the vehicle body with its surface including the protrusions 44 and the recesses 46 facing the vehicle cabin.

The reinforcing member 12 includes, near its first end (left end in FIG. 3) in the longitudinal direction, two holes 48a for securing the reinforcing member 12 to the dash panel 14. The reinforcing member 12 further includes, near its second end or the right end in FIG. 3, two holes 48b for securing the reinforcing member 12 to the floor reinforcement 18 or the floor frame member 18. The holes 48a and 48b are formed in the recesses 46. When fastening the reinforcing member 12 to the dash panel 14 and the floor frame member 18 with fastening members, bolts or nuts, the fastening members are placed in the recesses 46. This structure reduces protrusion of the fastening members toward the vehicle cabin.

As illustrated in FIG. 2, the dash panel 14 extends along the height of the vehicle body to a location near a lower end 64 of the front side member 22 located rearward of the vehicle body, and is then curved toward the vehicle cabin 60. While, in FIG. 2, the dash panel 14 is curved steeply toward the vehicle cabin 60 near the lower end 64 of the front side member 22, the dash panel 14 may be curved more smoothly. The front portion of the floor panel 16 located frontward of the vehicle body is slightly warped upward, such that the end of the front portion of the floor panel 16 is superposed on the dash panel 14. The floor reinforcement 18 (floor frame member) is welded to the floor panel 16 to form a closed section. The front portion of the floor reinforcement 18 is also warped slightly upward such that the end of the front portion located frontward of the vehicle body is superposed on the floor panel 16. The portions of the dash panel 14, the floor panel 16, and the floor reinforcement 18 that are superposed with each other are spot-welded. Further, the top face of the under reinforcement 24 and the bottom face of the floor panel 16 are welded together.

The ends of the front side member 22 located rearward of the vehicle body, including an upper end 62 and the lower end 64, are opposite to and coupled and secured to the dash panel 14. The lower end 64 of the front side member 22 may be opposite to the floor panel 16 which is warped upward, rather than the dash panel 14. In this structure, the lower end 64 may be coupled to the floor panel 16.

As illustrated in FIG. 1, the dash panel inner silencer 20 covers most of the dash panel 14, and extends along the height of the vehicle body downward to partially cover the floor reinforcement 18 and the floor panel 16.

As illustrated in FIG. 2, the reinforcing member 12 is disposed further toward the center of the vehicle cabin 60 with respect to the dash panel 14 and the floor frame member 18 and is opposite to the rear ends of the front side member 22, including the upper end 62 and the lower end 64. The reinforcing member 12 connects between the dash panel 14 and the floor frame member 18 with the upper portion, on the left end in FIG. 3, of the reinforcing member 12 being secured to the dash panel 14 and the lower portion on the right end in FIG. 3 being secured to the floor frame member 18. The reinforcing member 12 has a curvature that is smaller than the curvature (curvature toward the vehicle cabin 60) of the dash panel 14, so that the portion of the reinforcing member 12 between the upper portion and the lower portion is separated from the dash panel 14. The space formed between the reinforcing member 12 and the dash panel 14 includes a part of the dash panel inner silencer 20 or the soundproof member 20.

The method for securing the reinforcing member 12 to the dash panel 14 and the floor frame member 18 will be described in detail. The dash panel 14 includes two protrusions 54 protruding toward the vehicle cabin 60; that is, a pair of protrusions 54 arranged along the width of the vehicle body; one of which is illustrated in FIG. 2, on a surface facing the vehicle cabin 60, near the upper end 62 located rearward of the front side member 22. The protrusions 54 are threaded, and are inserted through two holes 49 in the dash panel inner silencer 20 formed correspondingly and the two holes 48a in the reinforcing member 12 formed along the width of the vehicle body, with their tip ends protruding from the reinforcing member 12 toward the vehicle cabin 60. The protrusions 54 are thus inserted through the holes 49 and 48a to align the dash panel inner silencer 20 and the reinforcing member 12 with the dash panel 14. Two nuts 42 are then screwed over the two protrusions 54 protruding from the reinforcing member 12 toward the vehicle cabin 60, respectively, to secure the upper portion of the reinforcing member 12 to the dash panel 14.

Two bolts 40 are further inserted into the two holes 48b arranged along the width direction of the vehicle body in the lower portion of the reinforcing member 12, respectively, from the surface of the reinforcing member 12 facing the vehicle cabin 60. FIG. 2 illustrates only one of the two holes 48b. The two bolts 40 pass through the two holes 48b in the reinforcing member 12 and the two holes 50 formed in the floor reinforcement 18, and engage with nuts 43 disposed on the rear side of the floor reinforcement 18. The lower portion of the reinforcing member 12 is thus secured to the floor reinforcement 18 (floor frame member).

Operational advantages of the vehicle body structure 10 according to the present embodiment will be described.

Figure 4:
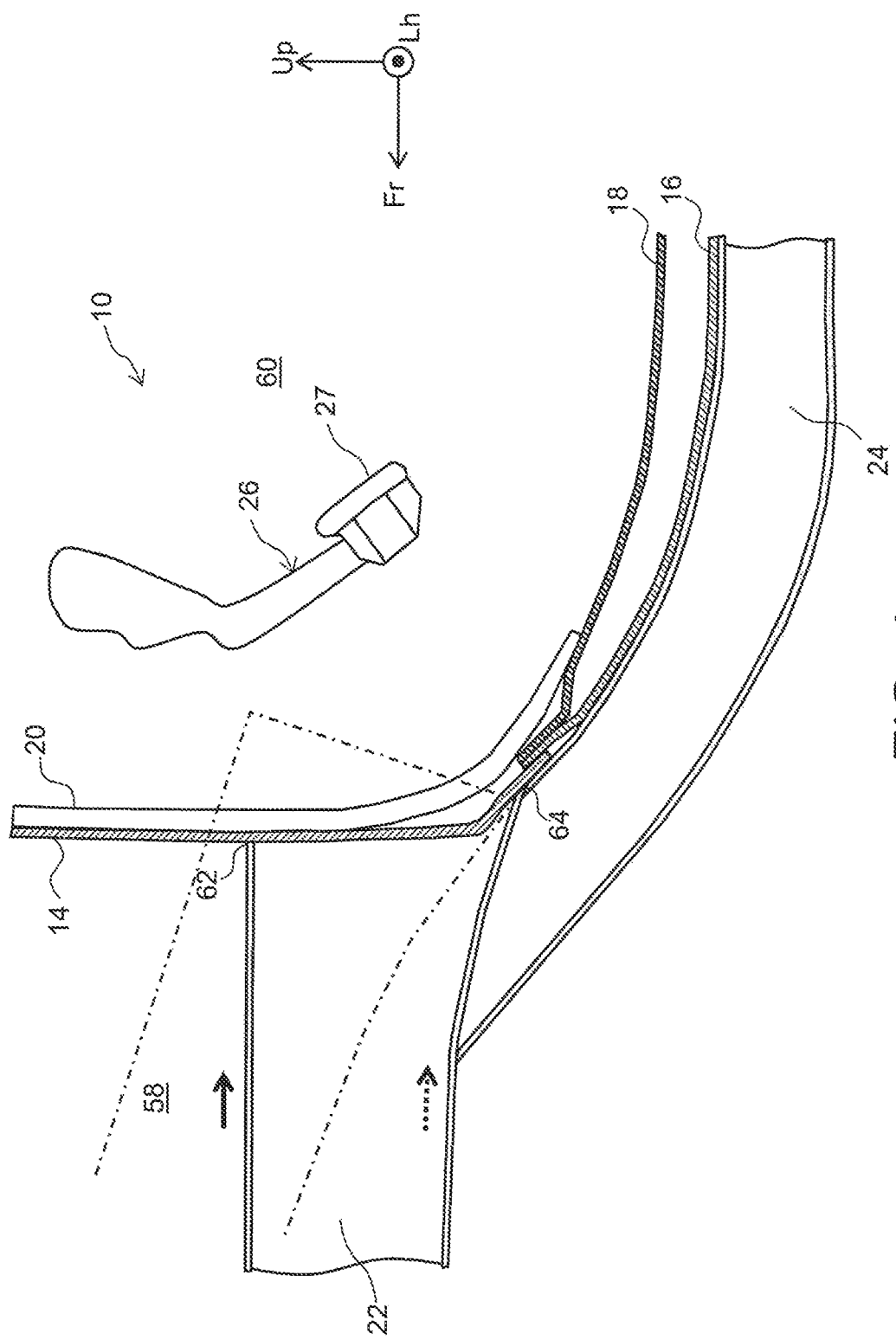
FIG. 4 is a diagram for explaining deformation of a front side member in a frontal crash in the absence of the reinforcing member.

FIG. 4 is a diagram for explaining deformation of the front side member 22 and the dash panel 14 in a frontal crash of a vehicle without the reinforcing member 12. In a frontal crash, an impact load toward the vehicle cabin 60 is applied to the front side member 22 as indicated by arrows in a black solid line and a dashed line in FIG. 4. In the portion of the front side member 22 near the lower end 64 located rearward of the vehicle body, the floor frame member 18 is present and also the dash panel 14, the floor panel 16, and the floor frame member 18 are superposed with each other. This portion therefore has high rigidity. The impact load, indicated by the dashed line arrow, applied to the lower portion of the front side member 22 may be received by the floor frame member 18 alone or along with the dash panel 14 and the floor panel 16.

On the other hand, in the portion of the front side member 22 near the upper end 62 located rearward of the vehicle body, only the dash panel 14 and the soundproof member 20 are present and this portion has low rigidity against the impact load, indicated by the arrow in black line, applied to the upper portion of the front side member 22. Therefore, as indicated by the dashed and single-dotted line in FIG. 4, the upper portion of the front side member 22 is inclined toward the vehicle cabin 60 about the portion of the front side member 22 near the lower end 64 and enters the vehicle cabin 60. This movement of the front side member 22 causes deformation of the dash panel 14.

In the vehicle body structure 10 according to the present embodiment, as illustrated in FIG. 2, the impact load, indicated by the arrow in black line, applied to the upper portion of the front side member 22 is transmitted, via the dash panel 14, the soundproof member 20, and the reinforcing member 12, to the floor frame member 18 and is received by the floor frame member 18. This structure reduces inclination of the upper portion of the front side member 22 toward the vehicle cabin 60, which further reduces deformation of the vehicle cabin 60.

In particular, the vehicle body structure 10 according to the present embodiment includes the reinforcing member 12 of a plate shape having a curvature that is smaller than the curvature of the dash panel 14, as illustrated in FIG. 2. More specifically, the reinforcing member 12 has an increased linearity, and the reinforcing member 12 having a linear shape having high linearity connects between the dash panel 14 and the floor frame member 18 to thereby efficiently transmit the impact load, indicated by the arrow in the black line, input to the upper portion of the front side member 22, via the reinforcing member 12, to the floor frame member 18. This structure appropriately inhibits or reduces deformation of the vehicle cabin 60 to further increase collision safety performance.

The reinforcing member 12 according to the present embodiment also achieves a lighter vehicle body compared to the structure including a reinforcing member having side walls extending from outer edges between the upper portion and the lower portion of the reinforcing member toward the dash panel 14. The reinforcing member 12 including a portion between its upper and lower portions not in contact with the dash panel 14 and other components may be used in various types of vehicles including the dash panel 14 and other components having different shapes.

The vehicle body structure 10 according to the present embodiment includes the soundproof member 20 which is partially disposed in a space between the dash panel 14 and the reinforcing member 12, as illustrated in FIG. 2. Therefore, when compared to the structure including the soundproof member 20 disposed to cover the surface of the reinforcing member 12 facing the vehicle cabin, the vehicle body structure 10 according to the present embodiment can provide an increased space of the vehicle cabin. As the dash panel inner silencer 20 or the soundproof member 20 has a larger thickness than the dash panel 14, for example, as described above, the structure according to the present embodiment can efficiently increase the vehicle cabin space. The structure including the reinforcing member 12 disposed opposite to the brake pedal 26, as in the structure of the present embodiment, has an increased space in front of the brake pedal 26, allowing the brake pedal 26 to be placed frontward of the vehicle body and increasing the space of the vehicle cabin.

The vehicle body structure 10 according to the present embodiment, which includes the soundproof member 20 supported by the dash panel 14 and the reinforcing member 12, can reduce vibration noise of the soundproof member 20. If the soundproof member 20 includes a loose portion, such a loose portion can be placed in a space between the dash panel 14 and the reinforcing member 12, so that vibration noise caused by the loose portion can be reduced.

As illustrated in FIG. 3, the reinforcing member 12 in the vehicle body structure 10 according to the present embodiment includes, on its surface, the protrusions 44 and the recesses 46, and fastening members, such as bolts and nuts, are placed in the recesses 46 of the reinforcing member 12. These protrusions 44 and the recesses 46 increase rigidity of the reinforcing member 12, and the fastening members placed in the recesses 46 do not significantly protrude toward the vehicle cabin.

While an embodiment of the vehicle body structure of the disclosure has been described, the vehicle body structure of the disclosure is not limited to this embodiment, but can be modified into various modes without departing from the gist of the vehicle body structure of the disclosure.

REFERENCE SIGNS LIST 10 vehicle body structure, 12 reinforcing member, 14 dash panel, 16 floor panel, 18 floor reinforcement (floor frame member), 20 dash panel inner silencer (soundproof member), 22 front side member, 24 under reinforcement, 26 brake pedal, 27 step portion, 40 bolt, 42, 43 nut, 44 protrusion, 46 recess, 48a, 48b, 49, 50 hole, 54 protrusion, 58 vehicle front part, 60 vehicle cabin, 62 upper end (end), 64 lower end (end).

The invention claimed is:

1. A vehicle body structure, comprising:
   a dash panel that separates a vehicle front part from a vehicle cabin, the dash panel includes a protrusion;
   a front side member extending along a length of a vehicle body in the vehicle front part, the front side member including a front end and a rear end, the rear end facing and secured to the dash panel;
   a floor frame member forming a floor frame of the vehicle cabin;
   a reinforcing member having a plate shape, the reinforcing member being disposed on the vehicle cabin side of the dash panel and the floor frame member and being disposed to face the rear end of the front side member, the reinforcing member including an upper portion secured to the dash panel and a lower portion secured to the floor frame member,
   the upper portion of the reinforcing member being disposed to face the front side member at a position nearer to an upper rear end than to a lower rear end of the front side member;
   the reinforcing member having a curvature that is smaller than a curvature of the dash panel;
   a soundproof member of a sheet shape having a predetermined thickness, the soundproof member being disposed on the vehicle cabin side of the dash panel, wherein:
   the upper portion of the reinforcing member is secured via the soundproof member to the dash panel;
   the soundproof member is secured, at the upper portion of the reinforcing member, between the dash panel and the reinforcing member;
   in a region between the upper portion and the lower portion of the reinforcing member, a space is created between the dash panel and the reinforcing member;
   the soundproof member is inserted into the space below the reinforcing member;
   at least a portion of the soundproof member disposed within the space is spaced apart from the dash panel and the reinforcing member; and
   the protrusion of the dash panel is positioned nearer to the upper rear end than the lower rear end of the front side member, the protrusion protrudes toward the vehicle cabin and through the soundproof member and the reinforcing member to align the soundproof member and the reinforcing member with the dash panel.

2. The vehicle body structure according to claim 1, wherein
   the reinforcing member is disposed to face a pedal in the vehicle cabin.

3. The vehicle body structure according to claim 1, wherein
   the reinforcing member includes a surface including a protrusion and a recess, and
   a fastening member is placed in the recess in the reinforcing member to fasten the reinforcing member to the dash panel and the floor frame member.

4. The vehicle body structure according to claim 2, wherein
   the reinforcing member includes a surface including a protrusion and a recess, and
   a fastening member is placed in the recess in the reinforcing member to fasten the reinforcing member to the dash panel and the floor frame member.

* * * * *